United States Patent
Honda

[15] 3,656,361
[45] Apr. 18, 1972

[54] SILENT CHAIN-TRANSMISSION APPARATUS

[72] Inventor: Shoichi Honda, Tokyo, Japan

[73] Assignee: Honda Giken Kogyo Kabushiki Kaisha, Tokyo, Japan

[22] Filed: July 28, 1970

[21] Appl. No.: 58,964

[30] Foreign Application Priority Data

July 29, 1969 Japan..................................44/59319

[52] U.S. Cl..............................................74/240, 75/245 S
[51] Int. Cl.....................................F16h 7/18, F16g 13/02
[58] Field of Search..........................74/245 S, 240, 219

[56] References Cited

UNITED STATES PATENTS

| | | |
|---|---|---|
| 1,840,081 | 1/1932 | Breer......................................74/245 S |
| 3,111,039 | 11/1963 | Peras.......................................74/240 |
| 2,718,153 | 9/1955 | Dean........................................74/219 |
| 2,766,634 | 10/1956 | Frank......................................74/240 |
| 3,069,920 | 12/1962 | Cole et al................................74/240 |

*Primary Examiner*—Leonard H. Gerin
*Attorney*—Waters, Roditi, Schwartz & Nissen

[57] ABSTRACT

A silent chain drivingly couples the sprockets on two spaced transmission shafts. The chain includes teeth for engaging the sprockets and link plates which straddle the sprockets. Guide rails are provided between the sprockets and either the rails or the link plates have portions which permit longitudinal displacement of the chain while preventing lateral movement thereof. One of the sprockets can be provided in splined engagement with its shaft to provide for automatic adjustment of its position.

9 Claims, 6 Drawing Figures

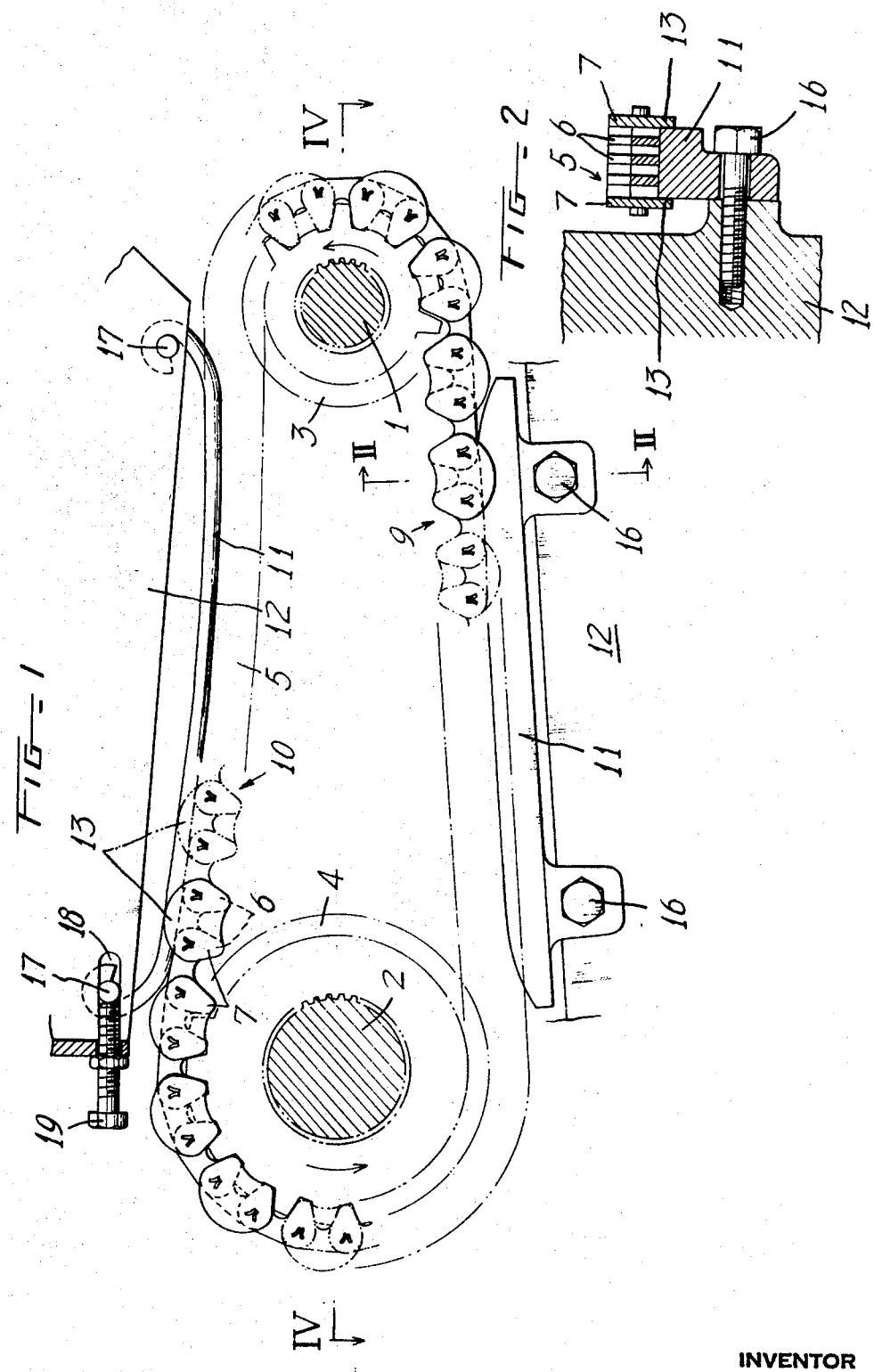

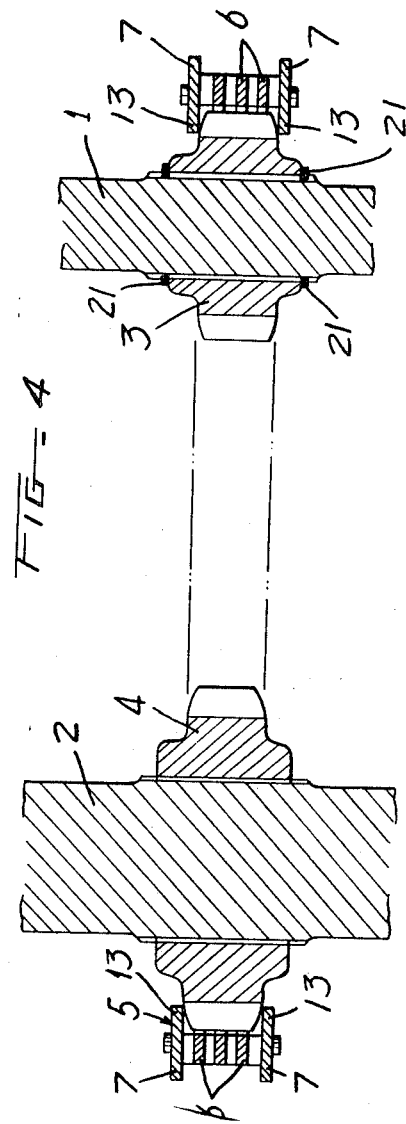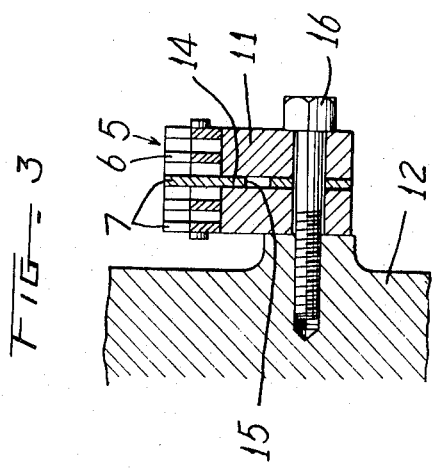

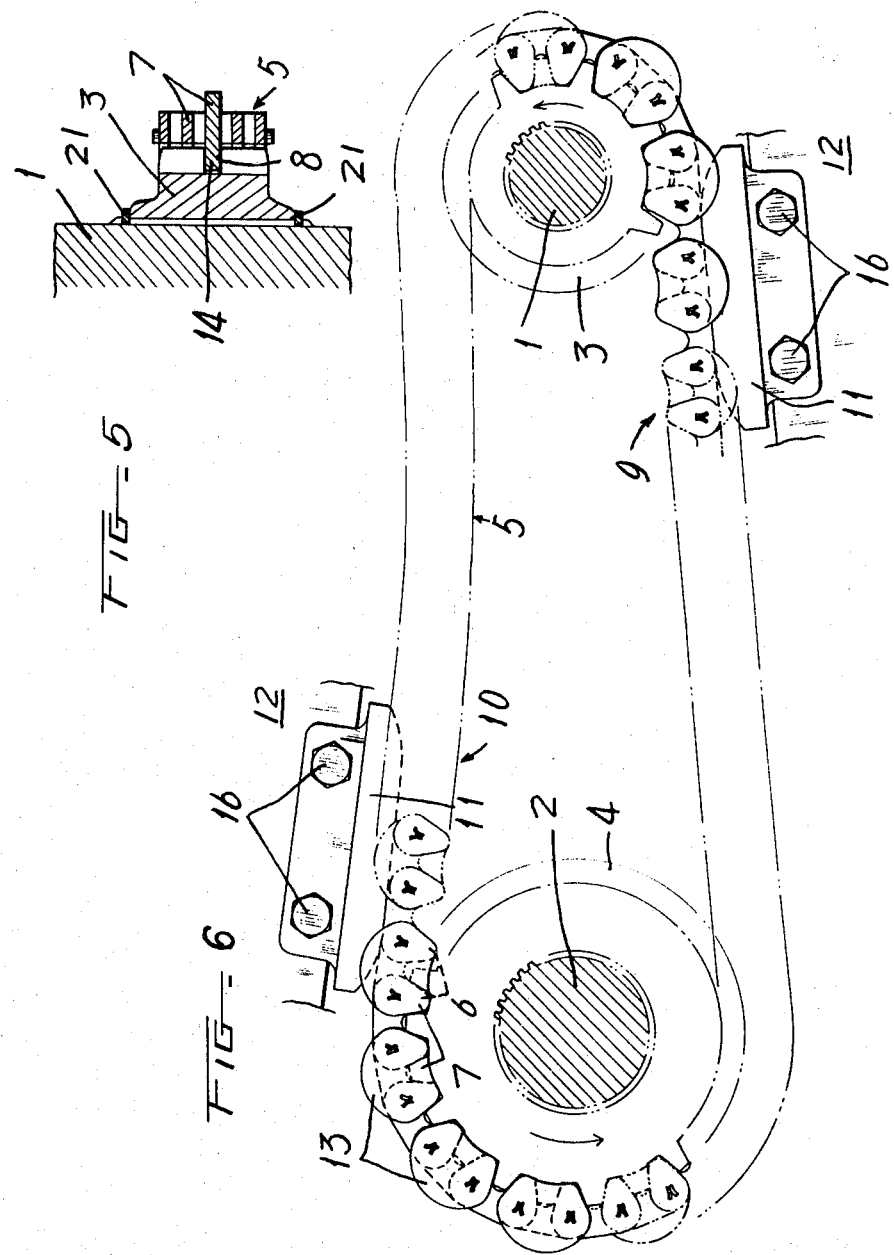

SILENT CHAIN-TRANSMISSION APPARATUS

BACKGROUND OF THE INVENTION

1. Field of the invention

This invention relates to transmission apparatus of the type wherein a silent chain is provided to couple sprockets on a pair of spaced transmission shafts.

2. Prior Art

It has been previously thought with respect to the above-mentioned kind of transmission apparatus that the path of travel of a chain could be sufficiently regulated by the sole use of a guide arranged between the chain and each sprocket. However, it has been found that this is not always sufficient. For instance, in some cases, the distance between two such transmission shafts is comparatively large as in the arrangement wherein the transmission is employed between a crankshaft and an overhead cam in an internal combustion engine, or wherein the rotational speed of the transmission shafts is high, in which cases the chain is likely to vibrate laterally within its straight line portions which are not in engagement with the sprockets. As a result, an abrasion occurs along all parts of the chain or the guide can be injured and, further, the chain can break in a relatively short time.

SUMMARY OF THE INVENTION

It is an object of the invention to provide an improved apparatus free from the above defects.

According to the invention, in a silent chain-transmission apparatus of the type wherein a silent chain, comprising a plurality of laterally arranged link lines, each of which is so formed by a large number of link plates (each having a pair of front and rear tooth forms) linked in endless series, is provided between a pair of sprockets on respective transmission shafts, and also wherein a guide apparatus is formed between the chain and each sprocket, each of the straight-line portions on both the tension side and the loose side of the chain is provided on its outerside (i.e., outwardly from the space enclosed by the chain) with a guide rail which is engaged therewith so that the chain may be longitudinally slidable but is laterally immovable. Such guide rail has a length of at least two tooth pitches and is fixed to an associated machine frame.

As a feature of the invention, the aforegoing guide rail is used to automatically compensate any incorrect disposition of the two sprockets so that the two sprockets can be aligned one with the other. Thus, any problem caused by such incorrect disposition (i.e., damage to the guide apparatus between the chain and the sprockets) can be prevented. In accordance with this feature, each guide rail is so formed that it extends over almost the whole length of the related straight-line portion, and at the same time at least one of the two sprockets is in spline engagement with its own shaft so as to be slidable in the axial direction of the shaft.

Embodiments of the invention will next be explained with reference to the accompanying drawings.

BRIEF DESCRIPTION OF THE DRAWING

FIG. 1 is a side view of one embodiment of the invention;
FIG. 2 is a sectional view taken along line II—II in FIG. 1;
FIG. 3 is a similar sectional view of a modified embodiment;
FIG. 4 is a sectional view taken along line IV—IV in FIG. 1;
FIG. 5 is a sectional view of a part of a modification thereof; and
FIG. 6 is a side view of another embodiment of the invention.

DETAILED DESCRIPTION

In the drawing, element 1 is a driving transmission shaft and element 2 is a driven transmission shaft. These shafts 1 and 2 are provided with respective gear-form sprockets 3 and 4 attached thereto. A silent chain 5 is provided to bridge the sprockets 3 and 4. The silent chain 5 comprises, in known manner, a number of laterally arranged link lines and each link line is so formed that a large number of link plates 7, each having a pair of front and rear tooth forms 6, are linked in series in the longitudinal direction thereof. In order that the chain is not laterally vibrated at those of its portions that are in engagement with sprockets 3 and 4, there are provided respective guide arrangements between elements 5 and 3, and 5 and 4.

Each guide arrangement is so formed that both of the outermost link plates 7 of the chain 5 are modified to forms not having the tooth forms 6 as shown in FIG. 1 and these modified link plates 7 are brought into external engagement with the respective sprockets 3 and 4 as shown in FIG. 6. Alternatively, the central link plate 7 of the chain 5 is modified into one not having the tooth forms 6 and the modified link plate 7 is brought in engagement with a groove 8 in the periphery of each sprocket 3 and 4 as shown in FIG. 5.

According to this invention, the tension-side straight-line portion 9 and the loose-side straight-line portion 10 of the chain 5 are provided on both outer sides (i.e., outwardly of the space encircled by the chain) thereof with respective guide rails 11 which are in engagement therewith so that the chain may be longitudinally slidable therealong but are laterally immovable. The guide rails are attached to a machine frame 12.

As for means for effecting such engagement, the chain 5 is so formed that both the outermost link plates 7 thereof are extended so that the same are brought in external engagement, at extended portions 13 with the guide rail 11 as shown clearly in FIG. 2. Alternatively, the chain is so formed that the central link plate 7 thereof is extended so that the same is brought in engagement, at extended portion 14, with a central groove 15 provided in the guide rail 11 as shown in FIG. 3.

Any desired means can be used for attaching the guide rails 11 to the machine frame 12. In the illustrated example of FIG. 1, the rail 11 cooperating with the tension side of the chain 5 is fixed to the machine frame 12 by means of bolts 16. The other side rail 11 is supported at both of its ends by pins 17. One of the pins 17 is fixed to the machine frame 12, and the other pin 17 is mounted within a guide groove 18 in the machine frame 12 so as to be slidable for adjustment under the control of a screw 19. Thus the upper rail 11 is in the form of a bow.

It is preferred that each side guide rail 11 has a length extending over almost the entire length of the associated straight-line portion 9 or 10, but the invention is not limited thereto. For instance, an arrangement is possible wherein each rail 11 is comparatively short and is provided near that portion of the chain whereat the engagement of the chain with each sprocket 3 or 4 begins. In this case, it is required that the length of the rail be greater than at least two tooth pitches.

By any of the foregoing constructions, the chain is restrained from moving from side to side in the vicinity of the related straight-line portions which extend between the two sprockets so that, even where the chain is comparatively long or the speed thereof is comparatively high, there is no lateral vibration of the chain and the various inconveniences mentioned above are eliminated.

A further feature of this invention is to provide for automatically compensating, in the foregoing apparatus, any incorrect disposition of the two sprockets. In accordance with this feature, each guide rail 11 is so formed that it extends over almost the entire length of each straight-line portion 9 or 10. At the same time one of the two sprockets 3 or 4, for instance, the driven sprocket 4, as shown in FIG. 4, is in spline engagement with its own shaft 2 so as to be slidable along the axis of the shaft, whereas the other sprocket 3 is provided on both outer sides thereof with stop rings 21 so as not to be laterally slidable.

With this construction, the chain 5 is supported along the related straight-line portion 9 or 10, extending over almost the whole length thereof, by a guide rail 11 for keeping each straight-line locus. Thus, when, for instance, the driven side sprocket 4 is more or less deflected therefrom, the sprocket 4 is forcibly moved to return to its correct position automatically by means of the guide apparatus formed between the sprocket 5 and the chain 4. Thereby, any incorrect disposition between the two sprockets can be automatically compensated.

What is claimed is:

1. A silent chain-transmission apparatus comprising transmission shafts, sprockets in said shafts, and a silent chain drivingly coupling said sprockets, said chain having tension and loose straight-line portions, said chain comprising a plurality of links in laterally arranged link lines, each link line including a plurality of link plates with respective pairs of front and rear tooth forms, the plates being linked in endless series, guide means between the chain and each said sprocket, said means comprising on each of the straight-line portions a guide rail engaged with the chain such that the chain is longitudinally slidably therealong but is laterally immovable, each said guide rail having a length of greater than at least two tooth pitches, the link plates of each link including at least one extended portion for engagement with the guide rails and machine frame means supporting the guide rails.

2. An apparatus as claimed in claim 1, wherein each side guide rail is so formed as to extend over almost the whole length of the corresponding straight-line portion and at least one of the sprockets is in spline engagement with the associated transmission shaft so as to be slidable in the axial direction of the shaft.

3. An apparatus as claimed in claim 1, wherein the chain includes central link plates having said extended portions for engagement in a central groove provided in the guide rails.

4. An apparatus as claimed in claim 1, wherein at least one of the guide rails is of adjustable bow shape, comprising means for adjusting the said bow shape.

5. An apparatus as claimed in claim 1, wherein said chain includes outermost link plates which straddle the respective sprockets.

6. An apparatus as claimed in claim 5 wherein said chain includes outermost link plates having said extended portions which straddle said guide rails.

7. An apparatus as claimed in claim 1, wherein the guide rails extend substantially completely between the sprockets.

8. An apparatus as claimed in claim 1 wherein said extended portions on the link plates are extended in a direction away from the tooth forms.

9. An apparatus as claimed in claim 1 wherein the link plates with the extended portions are without tooth forms.

* * * * *